United States Patent
Li et al.

(10) Patent No.: US 10,327,260 B2
(45) Date of Patent: Jun. 18, 2019

(54) METHOD FOR CHANNEL ACCESS AND RELATED NETWORK NODE

(71) Applicant: Telefonaktiebolaget LM Ericsson (publ), Stockholm (SE)

(72) Inventors: Gen Li, Beijing (CN); Junaid Ansari, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 108 days.

(21) Appl. No.: 15/516,616

(22) PCT Filed: Dec. 1, 2016

(86) PCT No.: PCT/CN2016/108202
§ 371 (c)(1),
(2) Date: Apr. 3, 2017

(87) PCT Pub. No.: WO2018/098769
PCT Pub. Date: Jun. 7, 2018

(65) Prior Publication Data
US 2018/0235006 A1     Aug. 16, 2018

(51) Int. Cl.
*H04W 74/08*     (2009.01)

(52) U.S. Cl.
CPC ............... *H04W 74/0808* (2013.01)

(58) Field of Classification Search
CPC ............ H04W 74/00; H04W 74/002; H04W 74/008; H04W 74/02; H04W 74/04; H04W 74/08; H04W 74/0833; H04W 74/0866
See application file for complete search history.

(56) References Cited

U.S. PATENT DOCUMENTS

| | | | |
|---|---|---|---|
| 2009/0034432 A1* | 2/2009 | Bonta | H04W 74/02 370/255 |
| 2015/0092654 A1* | 4/2015 | Ahmavaara | H04W 48/16 370/312 |

(Continued)

FOREIGN PATENT DOCUMENTS

| | | |
|---|---|---|
| WO | 2016003674 A1 | 1/2016 |
| WO | 2016186827 A1 | 11/2016 |
| WO | 2016197315 A1 | 12/2016 |

OTHER PUBLICATIONS

International Search Report and Written Opinion for International Patent Application No. PCT/CN2016/108202, dated May 22, 2017, 12 pages.

(Continued)

*Primary Examiner* — Hoang-Chuong Q Vu
(74) *Attorney, Agent, or Firm* — Withrow & Terranova, PLLC

(57) ABSTRACT

A method for channel access performed by a network node in a first wireless system is disclosed. In the method, the network node detects one or more wireless systems coexisted with the first wireless system on a channel, the channel operating on a shared spectrum. Then the network node determines a channel access scheme based on the detected one or more wireless systems. The channel access scheme may be one of listen before talk (LBT) channel access scheme, listen after talk (LAT) channel access scheme, and hybrid LBT and LAT channel access scheme. The network node performs channel access according to the determined channel access scheme. The related network node is also disclosed.

15 Claims, 5 Drawing Sheets

(56) References Cited

U.S. PATENT DOCUMENTS

| | | | |
|---|---|---|---|
| 2015/0289142 A1* | 10/2015 | Abeysekera | H04W 24/02 370/338 |
| 2015/0382374 A1* | 12/2015 | Bhorkar | H04W 24/00 370/330 |
| 2016/0037352 A1* | 2/2016 | Wei | H04W 72/1268 455/454 |
| 2016/0095110 A1* | 3/2016 | Li | H04W 72/1215 370/329 |
| 2016/0112992 A1* | 4/2016 | Bhushan | H04L 5/0042 370/330 |
| 2016/0174259 A1* | 6/2016 | Mukherjee | H04L 1/1816 370/280 |
| 2017/0041805 A1* | 2/2017 | Chandrasekhar | H04W 74/0816 |
| 2017/0048861 A1* | 2/2017 | Choi | H04L 5/0055 |
| 2017/0238334 A1* | 8/2017 | Yang | H04W 74/0816 370/336 |
| 2017/0257775 A1* | 9/2017 | Jiang | H04W 16/14 |
| 2017/0280475 A1* | 9/2017 | Yerramalli | H04W 72/14 |
| 2017/0310426 A1* | 10/2017 | Fan | H04L 1/0013 |
| 2017/0331577 A1* | 11/2017 | Parkvall | H04J 11/0079 |
| 2018/0295653 A1* | 10/2018 | Ashraf | H04W 4/00 |

OTHER PUBLICATIONS

Author Unknown, "Broadband Radio Access Networks (BRAN); 5 GHz high performance RLAN; Harmonized EN covering the essential requirements of article 3.2 of the R&TTE Directive," Harmonized European Standard 301 893, Version 1.7.1, European Telecommunications Standards Institute (ETSI), Jun. 2012, 90 pages.

Yücek, Tevfik et al., "A Survey of Spectrum Sensing Algorithms for Cognitive Radio Applications," IEEE Communications Surveys & Tutorials, vol. 11, Issue 1, Mar. 4, 2009, IEEE, pp. 116-130.

* cited by examiner

METHOD FOR CHANNEL ACCESS AND RELATED NETWORK NODE

This application is a 35 U.S.C. § 371 national phase filing of International Application No. PCT/CN2016/108202, filed Dec. 1, 2016, the disclosure of which is incorporated herein by reference in its entirety.

TECHNICAL FIELD

The present disclosure relates generally to wireless access technology, and in particular, to a method for channel access and related network node.

BACKGROUND

Mobile broadband will continue to drive demands for higher overall traffic capacity and higher achievable end-user data rates in a wireless access network. Several scenarios in the future will require the end-user data rates of up to 10 Gbps in local areas. In order to meet these demands for very high system capacity and very high end-user data rates, wireless access networks will be deployed with distances between access nodes ranging from a few meters in indoor deployments up to roughly 50 m in outdoor deployments. That is, the wireless access networks will have a considerably higher infrastructure density than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased path-loss at higher frequencies. Such the wireless access network is referred to as New Radio (NR) system.

Besides traditional licensed exclusive bands, the NR system is expected to be operating on unlicensed spectrum bands, such as 5 GHz and 60 GHz spectrums, especially for enterprise solutions. Thus the NR system needs to support coexistence, which enables spectrum sharing with different operators or other systems.

Listen-Before-Talk (LBT) channel access scheme (also referred to as "LBT scheme") is the most flexible way to achieve the spectrum sharing. In the LBT scheme, a transmitter may detect whether an operating channel is idle or not firstly. If the operating channel is idle, the transmitter may transmit data on the operating channel LBT channel access scheme is a distributed mechanism, so that there are no needs to exchange information between different systems which may be more difficult.

Listen-After-Talk (LAT) channel access scheme (also referred to as "LAT scheme") is provided to solve hidden terminal problem and exposed terminal problem occurred in directional communication. LAT scheme considers involving a receiver to sense the operating channel directly. Another motivation for LAT scheme is low interference environment (i.e. less collision) for naive direct transmission. For this reason, LAT scheme adopts opposite logic to LBT scheme. In LAT scheme, the transmitter sends data on the operating channel directly without detecting whether the operating channel is idle or not, and does not send data only when it is confirmed that the operating channel is occupied by interfering transmissions.

To compare different coexistence support mechanisms, simulations have been conducted to study both mean object user experience rate and 5% cell edge user experience rate under different traffic settings. The simulation results show that LBT scheme works much better than naive scheme (i.e. direct transmission without any coordination) and has similar performance with LAT scheme in 1 antenna case. This means LBT scheme is preferred and is widely used in current systems, e.g. Wi-Fi systems. However, in 100 antenna array case, LBT scheme has similar performance with naive scheme in low traffic case and worse performance than naive scheme in high traffic case. On the other hand, LAT scheme has much better performance than LBT scheme in terms of mean object user experience rate and 5% cell edge user experience rate.

Therefore LAT scheme performs much better than LBT scheme in beamforming case with massive Multi-Input Multi-Output (MIMO). However, NR systems or future wireless systems with high gain beamforming would not be able to rely solely on LAT scheme to have high performance characteristics in unlicensed spectrum bands due to the following reasons:

- LAT scheme needs signaling coordination between different systems or cells. In other words, it could only be used for coexistence between the same kind of systems, e.g. intra-NR coexistence or when different systems exercise a coordination mechanism.
- Some unlicensed spectrum regulations mandate the use of LBT scheme. For instance, in 5 GHz unlicensed spectrum in Europe, Japan, there is a regulatory requirement to implement LBT scheme.
- Unlicensed spectrum typically requires different access technologies to coexist with one another. For instance, in 5 GHz unlicensed spectrum, Wi-Fi systems (and in future Licensed Assisted Access (LAA) systems) are deployed, which perform LBT scheme. Thus NR or other future wireless systems operating in 5 GHz unlicensed spectrum and performing LAT scheme would not be able to provide good coexistence with the existing wireless systems such as Wi-Fi and LAA systems. Similarly, in 60 GHz unlicensed spectrum, there will be wireless systems based on IEEE 802.11ad (in future IEEE 802.11ay), IEEE 802.15.3c, etc., and need to coexist with one another. Using LAT scheme does not fulfill the coexistence requirements adequately.

SUMMARY

It is therefore an object of embodiments of the present disclosure to provide a channel access mechanism which can support coexistence of different wireless systems operating on unlicensed spectrum.

According to a first aspect of the disclosure, there is provided a method performed by a network node in a first wireless system for channel access. The network node detects one or more wireless systems coexisted with the first wireless system on a channel, the channel operating on a shared spectrum. The network node then determines a channel access scheme based on the detected one or more wireless systems. The channel access scheme may be one of LBT channel access scheme, LAT channel access scheme, and hybrid LBT and LAT channels access scheme. The network node performs channel access according to the determined channel access scheme.

In some embodiments, the network node determines whether the detected one or more wireless systems performs LBT channel access scheme or LAT channel access scheme. In response to all of the detected one or more wireless systems performing LBT channel access scheme, the network node determines the channel access scheme as LBT channel access scheme. In response to all of the detected one or more wireless systems performing LAT channel access scheme, the network node determines the channel access scheme as LAT channel access scheme. In response to some of the detected one or more wireless systems performing LBT channel access scheme and some performing LAT channel access scheme, the network node determines the channel access scheme as hybrid LBT and LAT channel access scheme.

In some embodiments, in response to determining the channel access scheme as the hybrid LBT and LAT channel access scheme, the network node performs the channel access according to the hybrid LBT and LAT channel access scheme. The network node determines a first energy level of the channel from one or more wireless systems performing LBT channel access scheme among the detected wireless systems. The network node then determines whether the channel is idle based on the first energy level. In response to the determination that the channel is idle, the network node transmits signals in the channel according to LAT channel access scheme.

In some embodiments, the network node detects a total energy level of the channel. Then the network node detects an energy level from each wireless system performing LAT channel access scheme among the detected one or more wireless systems. The network node then subtracts the detected energy levels from the total energy level to obtain the first energy level.

In some embodiments, the network node detects an energy level from each wireless system performing LBT channel access scheme among the detected one or more wireless systems. Then the network node sums the detected energy levels to obtain the first energy level.

In some embodiments, the network node further determines a channel access constraint on the channel The network node determines the channel access scheme based on the channel access constraint and the detected one or more wireless systems.

According to a second aspect of the disclosure, there is provided a network node in a first wireless system for channel access. The network node comprises a processor and a memory. The memory contains instructions executable by the processor, whereby the network node is operative to: detect one or more wireless systems coexisted with the first wireless system on a channel, the channel operating on a shared spectrum, determine a channel access scheme based on the detected one or more wireless systems, the channel access scheme being one of LBT channel access scheme, LAT channel access scheme, and hybrid LBT and LAT channels access scheme, and perform channel access according to the determined channel access scheme.

According to a third aspect of the disclosure, there is provided a computer readable storage medium having a computer program stored thereon. The computer program is executable by a device to cause the device to carry out the above method for channel access.

According to a fourth aspect of the disclosure, there is provided a computer program product executable by a device to cause the device to carry out the above method for channel access.

According to a fifth aspect of the disclosure, there is provide a device in a first wireless system for channel access. The device includes a first determination module operable to determine one or more wireless systems coexisted with the first wireless system on a channel, the channel operating on a shared spectrum. A second determination module operable to determine a channel access scheme based on the detected one or more wireless systems is also included. The channel access scheme may be one of LBT channel access scheme, LAT channel access scheme, and hybrid LBT and LAT channel access scheme. The device further includes a performing module operable to perform channel access according to the channel access scheme.

It is an advantage that the coexistence of different wireless systems with different access technologies on the shared spectrum can be supported. LBT channel access scheme can be performed for coexistence between NR system and non-NR systems (e.g. Wi-Fi system, LAA system, IEEE 802.11ad-based system, etc.). LAT channel access scheme can be performed for intra NR-NR systems coexistence. A further advantage is that spectrum reuse can be improved for NR system when using high gain beamforming.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
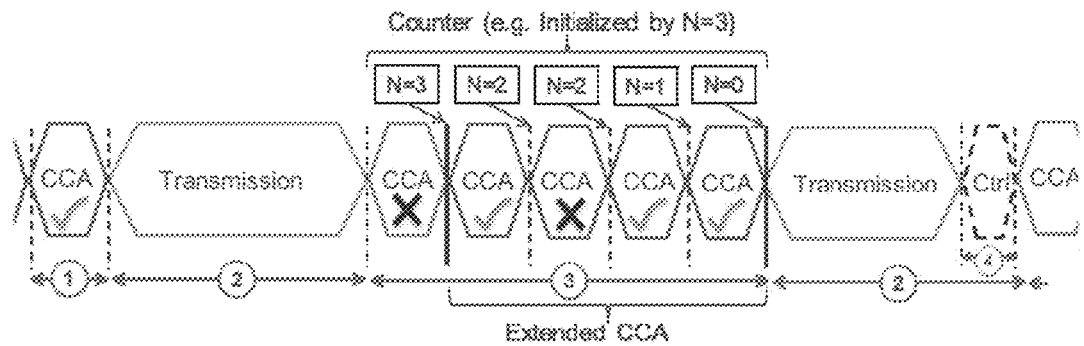
FIG. 1 is an example that illustrates Europe regulation EN 301.893.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

To facilitate understanding of the following embodiments of the present disclosure, an introduction of LBT channel access scheme and LAT channel access scheme will be provided.

I. Load-Based Clear Channel Assessment in Europe Regulation EN 301.893

For a device not utilizing the Wi-Fi protocol, European Telecommunications Standards Institute (ETSI) "Broadband Radio Access Networks (BRAN); 5GHz high performance RLAN; Harmonized EN Covering the essential requirement of article 3.1 of the R&TTE Directive," EN 301.893, Version 1.7.1, June 2012 (herein referred to as "EN 301.893"), provides the following requirements and minimum behavior for the load-based clear channel assessment.

1. Before a transmission or a burst of transmissions on an Operating Channel, the equipment shall perform a Clear Channel Assessment (CCA) check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).

2. If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that needs to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q of EN 301.893). The counter is decremented every time a CCA slot is considered to be "unoccupied". When the counter reaches zero, the equipment may transmit.

NOTE 1: The equipment is allowed to continue Short Control Signaling Transmissions on this channel providing it complies with the requirements in clause 4.9.2.3 of EN 301.893.

NOTE 2: For equipment having simultaneous transmissions on multiple (adjacent or non-adjacent) operating channels, the equipment is allowed to continue transmissions on other Operating Channels providing the CCA check did not detect any signals on those channels.

3. The total time that an equipment makes use of an Operating Channel is the Maximum Channel Occupancy Time which shall be less than (13/32)×q ms, with q as defined in point 2 above, after which the device shall perform the Extended CCA described in point 2 above.

4. The equipment, upon correct reception of a packet which was intended for this equipment, can skip CCA and immediately (see NOTE 3) proceed with the transmission of management and control frames (e.g. ACK and Block ACK frames). A consecutive sequence of transmissions by the equipment, without it performing a new CCA, shall not exceed the Maximum Channel Occupancy Time as defined in point 3 above.

NOTE 3: For the purpose of multi-cast, the ACK transmissions (associated with the same data packet) of the individual devices are allowed to take place in a sequence.

5. The energy detection threshold for the CCA shall be proportional to the maximum transmit power (PH) of the transmitter: for a 23 dBm equivalent isotropically radiated power (e.i.r.p.) transmitter, the CCA threshold level (TL) shall be equal or lower than −73 dBm/MHz at the input to the receiver (assuming a 0 dBi receive antenna). For other transmit power levels, the CCA threshold level TL shall be calculated using the formula: TL=−73 dBm/MHz+23−PH (assuming a 0 dBi receive antenna and PH specified in dBm e.i.r.p.).

An example to illustrate the EN 301.893 is provided in FIG. 1.

To meet the regulation requirements as described above, Wi-Fi systems and LAA systems are developing LBT channel access scheme as below.

II. LBT Channel Access Scheme for Wi-Fi Systems

Figure 2:
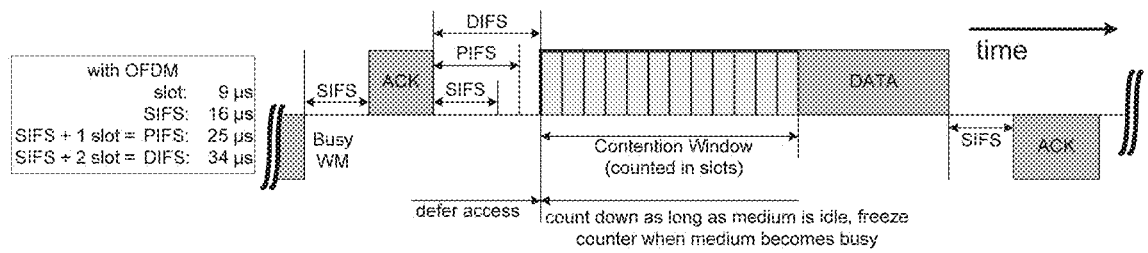
FIG. 2 is a general illustration of LBT scheme.

In typical deployments of a Wireless Local Area Network (WLAN), Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle. When the range of several WLAN Access Points (Aps) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded compared to their isolated deployments. A general illustration of the LBT scheme is shown in FIG. 2.

After a Wi-Fi station A transmits a data frame to a station B, station B shall transmit the Acknowledgement (ACK) frame back to station A with a delay of 16 μs (referred to as Short Inter-frame Spacing (SIFS)). Such an ACK frame is transmitted by station B without performing the LBT operation. To prevent another station interfering with such an ACK frame transmission, a station shall defer for a duration of 34 μs (referred to as Distributed Coordination Function Inter-frame Spacing (DIFS)) after the channel is observed to be occupied before a subsequent attempt to assess again whether or not the channel is occupied.

Therefore, a station that wishes to transmit first performs a CCA by sensing the medium for a fixed duration DIFS. If the medium is found to be idle, the station assumes that it may take ownership of the medium and begin a frame exchange sequence. If the medium is busy, the station waits for the medium to go idle, defers for DIFS, and waits for a further random back off period.

To further prevent a station from occupying the channel continuously and thereby prevent other stations from accessing the channel, it is required for a station wishing to transmit again after a transmission is completed to perform a random back off.

The Point Coordination Function (PCF) Inter-frame Spacing (PIFS) is used to gain priority access to the medium, and is shorter than the DIFS duration. Among other cases, it can be used by STAs operating under PCF, to transmit Beacon Frames with priority. At the nominal beginning of each Contention-Free Period (CFP), the Point Coordinator (PC) shall sense the medium. When the medium is determined to be idle for one PIFS period (generally 25 μs), the PC shall transmit a Beacon frame containing the Contention Free (CF) Parameter Set element and a delivery traffic indication message element.

The widely used Wi-Fi systems based on IEEE 802.11g/n/ac standards operate in low frequencies (sub 6 GHz frequencies), and listen and talk operations, i.e., sensing, reception and transmission are omni-directional. The key objective of LBT scheme is to avoid interference between simultaneous data transmission.

III. LBT Channel Access Scheme for LAA Systems

An evolved NodeB (eNB) may transmit a transmission including Physical Downlink Shared Channel (PDSCH) on a channel on which LAA Scell(s) transmission(s) are performed, after first sensing the channel to be idle during the slot durations of a defer duration $T_d$, and after the counter N is zero in Step 4 below. The counter N is adjusted by sensing the channel for additional slot duration(s) according to the steps below:

Step 1: Set $N=N_{init}$, where $N_{init}$ is a random number uniformly distributed between 0 and $CW_p$, and go to Step 4;

Step 2: If N>0 and the eNB chooses to decrement the counter, set N=N−1;

Step 3: Sense the channel for an additional slot duration, and if the additional slot duration is idle, go to Step 4, else go to Step S;

Step 4: If N=0, stop, else go to Step 2;

Step 5: Sense the channel during the slot durations of an additional defer duration $T_d$;

Step 6: If the channel is sensed to be idle during the slot durations of the additional defer duration $T_d$, go to Step 2, else go to Step 5.

If the eNB has not finished a transmission including PDSCH on a channel on which LAA Scell(s) transmission(s) are performed after Step 4 in the procedure above, the eNB may transmit a transmission including PDSCH on the channel, after sensing the channel to be idle at least in the slot durations of an additional defer duration.

The defer duration $T_d$ consists of duration 16 $\mu s \leq T_f \leq 16$ $\mu s+T_s$ immediately followed by $m_p$ consecutive slot durations where each slot duration is 9 $\mu s \leq T_{sl} \leq 9$ $\mu s+T_s$, and $T_f$ includes an idle slot duration $T_{sl}$ at start of $T_f$.

A slot duration $T_{sl}$ is considered to be idle if the eNB senses the channel during the slot duration, and the power detected by the eNB for at least 4 $\mu s$ within the slot duration is less than energy detection threshold $X_{Thresh}$. Otherwise, the slot duration $T_{sl}$ is considered to be busy.

$CW_{min,p} \leq CW_p \leq CW_{max,p}$ is the contention window. $CW_{min,p}$ and $CW_{max,p}$ are chosen before Step 1 of the procedure above.

$m_p$, $CW_{min,p}$, and $CW_{max,p}$ are based on channel access priority class associated with the eNB transmission, as shown in Table 1.

If the eNB transmits discovery signal transmission(s) not including PDSCH when N>0 in the procedure above, the eNB shall not decrement N during the slot duration(s) overlapping with discovery signal transmission.

The eNB shall not continuously transmit on a channel on which the LAA Scell(s) transmission(s) are performed, for a period exceeding $T_{mcot,p}$ as given in Table 1.

For p=3 and p=4, if the absence of any other technology sharing the carrier can be guaranteed on a long term basis (e.g. by level of regulation), $T_{mcot,p}$=10 ms, otherwise, $T_{mcot,p}$=8 ms.

IV. LAT Channel Access Scheme

Unlike the omni-directional transmit and receive antenna radiation patterns, directional communication has different hidden and exposed terminal problems. Moreover narrow beamwidth directional transmissions are more prone to deafness problem compared to wider beamwidth transmissions.

Hidden terminal problem refers to the case where a transmitter is unable to listen to a potential interferer resulting into packet collision at a receiver.

Exposed terminal problem refers to the case where a potential transmitter overhears an ongoing transmission and refrains from its own transmission although its transmission would have not interfered with the ongoing transmission at a receiver.

Deafness problem refers to the case where a receiver is unable to hear the directional transmission from a transmitter.

LAT channel access scheme is introduced to solve the abovementioned hidden terminal problem and exposed terminal problem in massive antennas case. The key reason to have such severe problems for LBT scheme is the large difference between sensed power at the source node (SN) side and interference power at the destination node (DN) side in high gain beamforming case. LBT scheme relies on listening at transmitter side to determine if there will be interference at receiver side and thus large difference between them will result in severe problems. To solve it, LAT scheme considers involving the receiver to sense the channel directly. Another motivation for LAT scheme is low interference environment, i.e. less collision, for naive direct transmission. For this reason, LAT scheme adopts the opposite logic compared to LBT scheme. The default mode for transmitter is 'to send' and data is not sent only when it is confirmed that channel is occupied by interfering transmissions. The key idea is that the SN transmits when data packets arrive and then solve collision detected by DN using coordination signaling.

To understand LAT scheme clearly, following definitions are introduced:

"Idle time" is assumed after continuous data transmission. This is reasonable for unlicensed spectrum bands since there are typically channel occupation limitation rules, e.g., the SN must stop transmitting and enter idle state after the contiguous transmission time exceeds a given threshold.

Notify-To-Send (NTS) message: this message can be transmitted by SN or DN, including the link information which will transmit data and expected occupation time duration.

Notify-Not-To-Send (NNTS) message: this message is transmitted from DN, telling its SN not to transmit data in indicated duration.

A short description of an example that illustrates LAT scheme is given here. First, the listening function at DN side

TABLE 1

Channel Access Priority Class

Figure 3:
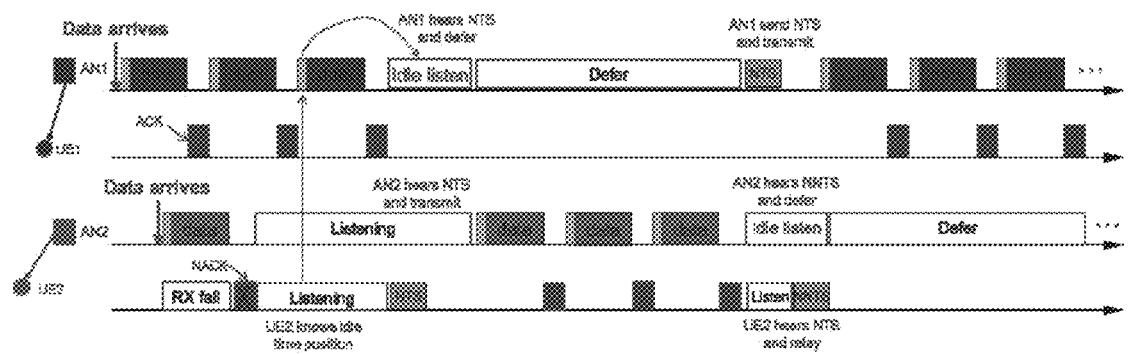
FIG. 3 is an example that illustrates LAT scheme.

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} | is triggered when it detects interference and fails to receive the data. Then the DN of interfered link will coordinate the data transmission with SN of the interfering link(s). Finally, the coordination will be performed in idle time of interfering link One example is shown in FIG. 3, where AN2-≤UE2 is interfered by AN1-≤UE1. When UE2 fails to decode the data, it starts to look for the idle period of interfering link and sends NTS message towards AN2 direction. Since UE2 is interfered by AN1, AN1 can receive the NTS message as well and then defer the transmission as the NTS message indicates. Besides, the NTS message also indicates when AN2 will stop transmission and listen, i.e., idle period of AN2-≤UE2. Then AN1 transmits NTS message that can be received by UE2. Finally NNTS message is relayed by UE2 to let its transmitter AN2 know which resource is occupied by the interfering link and not transmit. By this scheme, the transmission of this interference pair (i.e. AN1-UE1 and AN2-UE2) is coordinated in distributed way to transmit data by turns.

Figure 4:
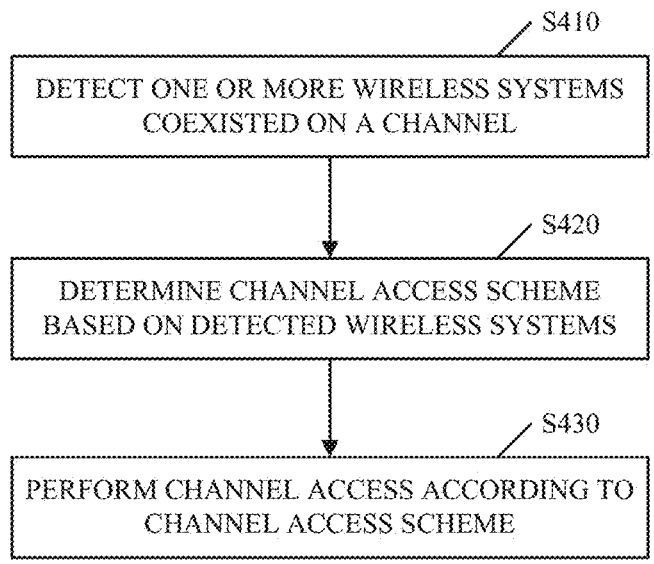
FIG. 4 is a flowchart depicting a method for channel access according to some embodiments of the present disclosure.

FIG. 4 shows a flowchart depicting a method for channel access according to some embodiments of the present disclosure. In the embodiments described herein, the method may be applied to a shared spectrum, including unlicensed spectrum such as 5 GHz spectrum or 60 GHz spectrum and licensed shared spectrum. Also the method may be performed by a network node in a first wireless system. The first wireless system may be any wireless system with high gain beamforming, e.g. NR system, and may support LBT channel access scheme and LAT channel access scheme. The network node may be an access node which may handle the channel access.

As shown in FIG. 4, at step S410, the network node may detect one or more wireless systems coexisted with the first wireless system on a channel operating on the shared spectrum. Hereinafter the one or more wireless systems coexisted with the first wireless system can be referred to as "coexisting system(s)" for simplicity. In this step, the network node may detect the coexisting system(s) deployed in the vicinity of the network node. This detection may be achieved by monitoring surrounding spectral environment.

In some embodiments, the network node may detect feature information specific to a wireless system on the channel. In general, each protocol has its typical feature. Accordingly a wireless system utilizing the protocol may be identified using the typical feature of the protocol. For example, there is a predefined preamble sequence at the head of each packet in Wi-Fi system. The predefined preamble sequence may become the feature information specific to the Wi-Fi system. In addition, the network node may detect NR system operated by a different operator based on an identifier of the operator. Generally the identifier of the operator may be obtained from the discovery signal. Upon detection of the feature information, the network node may determine that the wireless system exists. In the above example of the Wi-Fi system, the network node may use the detected preamble sequence to make correlation in the channel. If the correlation is successful, the network node may determine the existence of the Wi-Fi system.

In some embodiments, besides the network node monitors the spectral environment, the network node may configure its connected wireless terminal(s) to monitor and report channel status of the channel. The wireless terminal may detect the feature information of the wireless system on the channel to determine whether the wireless system exists. Then the wireless terminal may report the monitoring information to the network node. After receiving the monitoring information about the existence of the wireless system operating on the channel from the wireless terminal(s), the network node may determine the wireless system(s) coexisted on the channel. In an example, the wireless terminal supporting multiple protocols may use cell search method to discover whether there is any access node around. For example, the wireless terminal supports both LAA and NR. The wireless terminal may search discovery signals of LAA system and NR system to determine whether there exists LAA system or NR system around.

In some embodiment, the wireless terminal(s) connected to the network node may report its supporting protocol(s) to the network node. The network node may configure different wireless terminals to monitor different systems according to capabilities of the wireless terminals. In addition, the network node may configure idle wireless terminals or wireless terminals with less data buffering to monitor the channel.

In addition, the network node may obtain the monitoring information from dedicated spectrum sensor(s). The dedicated spectrum sensor may provide the existence information of the wireless system(s) on the channel to the network node, whereby the network node may determine the coexisting system(s) on the channel in the vicinity.

In some embodiments, the network node may detect the coexisting system(s) on the channel at initialization of the network node. When powered on, the network node may monitor the channel for a certain time period to detect the coexisting system(s) around. Also the network node may detect the coexisting system(s) periodically at a configurable interval during the operation. Thus the network node may know the change of the coexisting system(s) in time.

In addition, the network node may trigger the detection of the coexisting system(s) in response to a predefined event. The predefined event may relate to channel performance. In operation, the network node may perform interference measurement on the channel. When the error-code rate of the channel increases to exceed a threshold or the Signal to Interference plus Noise Ratio (SINR) decreases to below a threshold, for example, it is most probably that more coexisting systems are deployed. Then the network node starts to detect the coexisting system(s).

Then at step S420, the network node may determine a channel access scheme based on the detected coexisting system(s). In the embodiments described herein, the channel access scheme may be selected from a group containing LBT scheme, LAT scheme, and hybrid LBT and LAT channel access scheme (also referred to as "hybrid LBT and LAT scheme"). LBT scheme and LAT scheme have been described above, and the hybrid LBT and LAT scheme will be described later.

Figure 5:
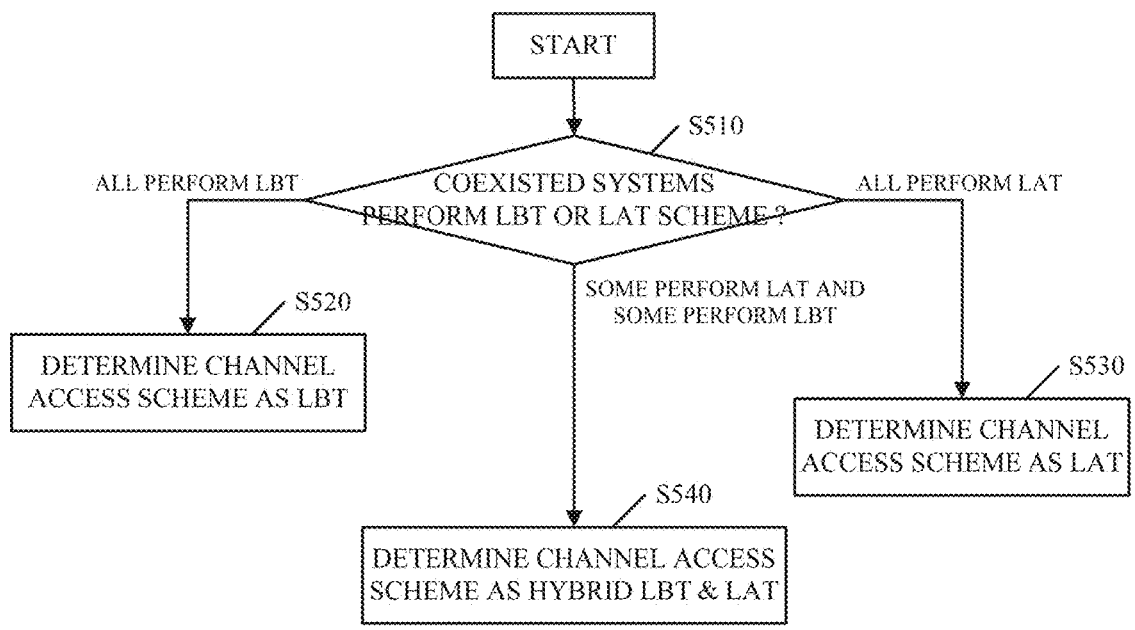
FIG. 5 is a flowchart depicting a procedure of determining a channel access scheme according to some embodiments of the present disclosure.

FIG. 5 illustrates a procedure of determining the channel access scheme (step S420) according to some embodiments of the present disclosure. As shown in FIG. 5, at step S510, the network node may determine whether the detected coexisting system(s) perform LBT scheme or LAT scheme. As described above, Non-NR systems, e.g. Wi-Fi system, LAA system, IEEE 802.11 ad-based system, etc., perform LBT scheme. NR system may support LBT scheme and LAT scheme, and perform either one in operation. Therefore the network node may know which one of LBT and LAT schemes is performed by each of the coexisting system(s).

Then at step S520, if all of the coexisting system(s) perform LBT scheme, the network node may determine the channel access scheme as LBT scheme. In this case, only the wireless system(s) performing LBT scheme are present in the coexisting system(s), and LBT scheme is therefore determined for the coexistence between NR system and non-NR system(s).

At step S530, if all of the coexisting system(s) perform LAT scheme, the network node may determine the channel access scheme as LAT scheme. In this case, only the wireless system(s) performing LAT scheme are present in the coexisting system(s), and LAT scheme is therefore determined for the intra NR systems coexistence.

At step S540, if some of the coexisting system(s) perform LBT scheme and some perform LAT scheme, the network node may determine the channel access scheme as hybrid LBT and LAT scheme. In this case, both of the wireless systems performing LBT scheme and the wireless systems performing LAT scheme are present, and hybrid LBT and LAT scheme is therefore determined to support coexistence.

Hybrid LBT and LAT scheme is a channel access scheme which uses energy level of the channel from the coexisting system(s) performing LBT scheme to determine whether the channel is idle or busy according to LBT scheme, and then uses LAT scheme in data transmission.

Further if the network node does not know the channel access scheme of the coexisting system, the network node will treat it as the wireless system performing LBT scheme.

Return to FIG. 4, at step S430, the network node may perform channel access according to the determined channel access scheme. Upon the determination of the channel access scheme, the network node notify its connected wireless terminal(s) of the determined channel access scheme so that the wireless terminal(s) can use the determined channel access scheme for data transmission.

In the case that the determined channel access scheme is LBT scheme, the network node and the related wireless terminals perform LBT scheme, as described above with reference to FIG. 2.

In the case that the determined channel access scheme is LAT scheme, the network node and the related wireless terminals perform LAT scheme, as described above with reference to FIG. 3.

Figure 6:
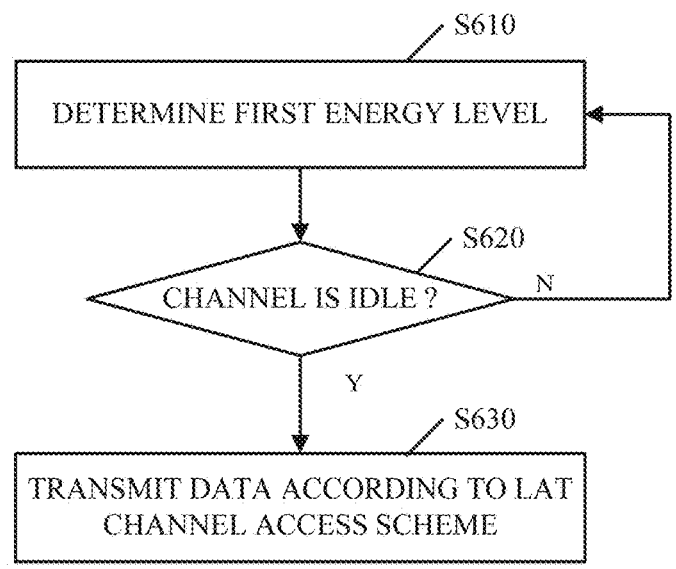
FIG. 6 is a flow chart depicting a procedure of hybrid LBT and LAT channel access scheme according to some embodiments of the present disclosure.

In the case that the determined channel access scheme is hybrid LBT and LAT scheme, the network node and the related wireless terminals perform hybrid LBT and LAT scheme. FIG. 6 illustrates a procedure of hybrid LBT and LAT scheme according to some embodiments of the present disclosure. The following description of hybrid LBT and LAT scheme will be made from the viewpoint of the network node as an example.

As shown in FIG. 6, at step S610, the network node may determine a first energy level of the channel from one or more wireless systems performing LBT scheme among the coexisting systems. This step may be performed by means of energy detection. The detected energy only includes receiving power from the coexisting system(s) performing LBT scheme.

In some embodiments, the first energy level Pd may be determined by subtraction method. Specifically, the network node may detect a total energy level Pt of the channel from all the coexisting system(s) first. Then the network node may detect an energy level Pi from each wireless system performing LAT scheme among the coexisting system(s). The energy level Pi may be detected by preamble detection, for example, Demodulation Reference Signal (DMRS), or preamble transmitted at the head of each data packet. Then the network node may subtract the detected energy levels from the total energy level Pt to obtain the first energy level Pd, i.e. Pd=Pt−Pi, i=1, 2, . . . .

In some embodiments, the first energy level Pd may be determined by addition method. Specifically, the network node may detect an energy level from each wireless system performing LBT scheme among the coexisting system(s). As described above, the network node knows the coexisting system(s) and the channel access scheme that each of the coexisting system(s) performs through step S410. For example, the network node knows the coexisting system(s) performing LBT scheme are Wi-Fi systems. Thus the network node will only detect the energy level using Wi-Fi preamble. Then the network node may sum all the detected energy levels to obtain the first energy level Pd.

After determining the first energy level of the channel, at step S620, the network node may determine whether the channel is idle based on the first energy level. According to LBT scheme, the first energy level is compared with the energy detection threshold. If the first energy level exceeds the threshold, the channel will be considered as being busy. In this case, the network node continues to perform the energy detection. If the first energy level is less than the threshold, the channel will be considered as being idle. Generally in LBT scheme, a backoff counter may be set. Every time the first energy level is less than the threshold, the backoff counter is decreased by 1. The channel is determined to be idle until the backoff counter becomes zero.

In response to the determination that the channel is idle, at step S630, the network node may transmit signals in the channel according to LAT scheme. The signals are formatted as shown in FIG. 3.

It can be seen from the above description that the method for channel access according to some embodiments of the present disclosure can support the coexistence of different systems on the shared spectrum by combining LBT scheme with LAT scheme. LBT scheme can be performed for coexistence between NR system and non-NR systems (e.g. Wi-Fi system, LAA system, IEEE 802.11ad-based system, etc.), and LAT scheme can be performed for intra NR-NR systems coexistence.

Figure 7:
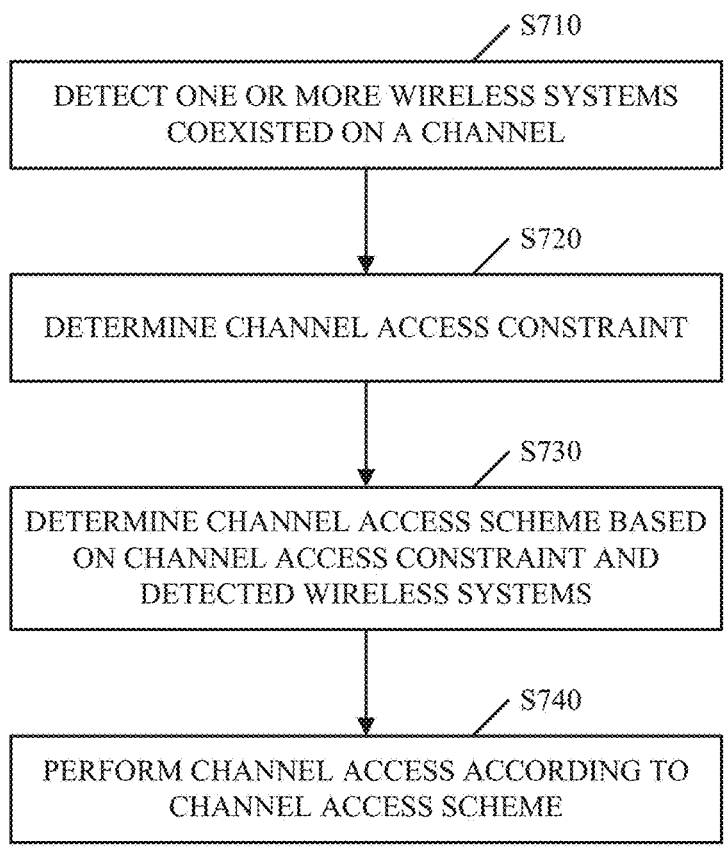
FIG. 7 is a flow chart depicting the method for channel access according to some embodiments of the present disclosure.

FIG. 7 shows another flowchart depicting the method for channel access according to some embodiments of the present disclosure. In the embodiments described herein, the channel access constraint on the channel is considered during the determination of the channel access scheme.

As shown in FIG. 7, at step S710, the network node may detect the coexisting system(s) on the channel. This step is similar to the step S410 as described above.

At step S720, the network node may determine one or more channel access constraints on the channel. The channel access constraint may be spectrum regulations in some countries. For example, in 5 GHZ unlicensed spectrum in Europe and Japan, LBT scheme is mandatory in the channels used by the wireless system. A person skilled in the art will appreciate that the channel access constraint is not limited to the above example, and can be any other constraint on the channel access.

Then at step S730, the network node may determine the channel access scheme based on the channel access constraint and the coexisting system(s). For example, the channel access constraint is that LBT scheme is mandatory in the channel. In this case, if all of the coexisting system(s) perform LBT scheme, the network node determines the channel access scheme as LBT scheme. If some or all of the coexisting system(s) perform LAT scheme, the network node will determine the channel access scheme as hybrid LBT and LAT scheme.

Upon the determination of the channel access scheme, at step S740, the network node may perform the channel access according to the determined channel access scheme. This step is similar to the step S430 as described above.

Although FIG. 7 shows steps 710 and 720 sequentially, a person skilled in the art will appreciate that steps S710 and S720 can be performed in any sequence or substantially concurrently.

It can be seen from the above description, the method for channel access as shown in FIG. 7 can further satisfy regulatory requirements on the channel access.

Figure 8:
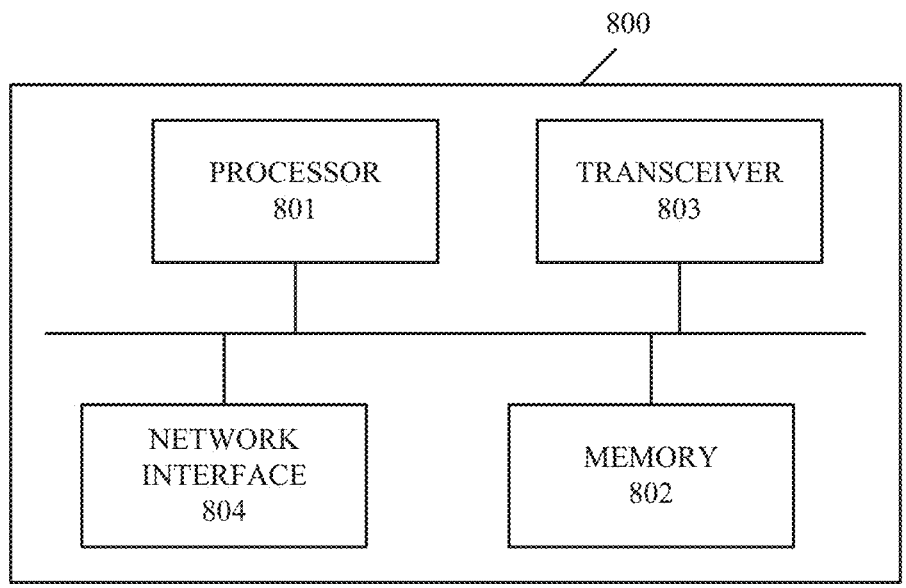
FIG. 8 is a schematic block diagram of a network node according to some embodiments of the present disclosure.

FIG. 8 is a schematic block diagram of a network node 800 in a first wireless system according to some embodiments of the present disclosure. The network node 800 may be an access node of the NR system. As shown in FIG. 8, the network node 800 may comprise a processor 801 and a memory 802. The memory 802 may contain instructions executable by the processor 801. The network node 800 is operative to detect one or more wireless systems coexisted with the first wireless system on a channel, the channel operating on the shared spectrum, to determine a channel access scheme based on the detected one or more wireless systems, the channel access scheme being one of LBT scheme, LAT scheme, and hybrid LBT and LAT scheme, and to perform channel access according to the channel access scheme.

The processor 801 may be of any type suitable to the local technical environment, and may comprise one or more of general purpose computers, special purpose computers, microprocessors, digital signal processors (DSPs) and processors based on multi-core processor architectures, as non-limiting examples. The memory 802 may be of any type suitable to the local technical environment and may be implemented using any suitable data storage technology, such as semiconductor based memory devices, flash memory, magnetic memory devices and systems, optical memory devices and systems, fixed memory and removable memory.

In some embodiments, the network node 800 is further operative to detect feature information specific to a wireless system on the channel. In response to the detection of the feature information, the network node 800 is further operative to determine existence of the wireless system on the channel.

In some embodiments, the network node 800 is further operative to obtain information of a wireless system operating on the channel from at least one wireless device which is configured to monitor channel status of the channel, and to determine the one or more wireless systems coexisted on the channel from the obtained information.

In some embodiments, the network node 800 is further operative to determine whether the detected one or more wireless systems perform LBT scheme or LAT scheme. In response to all of the detected one or more wireless systems performing LBT scheme, the network node 800 is further operative to determine the channel access scheme as LBT scheme. In response to all of the detected one or more wireless systems performing LAT scheme, the network node 800 is further operative to determine the channel access scheme as LAT scheme. In response to some of the detected one or more wireless systems performing LBT channel access scheme and some performing LAT channel access scheme, the network node 800 is further operative to determine the channel access scheme as hybrid LBT and LAT channel access scheme.

In some embodiments, the network node 800 is further operative to determine a first energy level of the channel from one or more wireless systems performing LBT scheme among the detected one or more wireless systems, to determine whether the channel is idle based on the first energy level, and, in response to the determination that the channel is idle, to transmit signals in the channel according to the LAT scheme.

In some embodiments, the network node 800 is further operative to determine a channel access constraint on the channel, and to determine the channel access scheme based on the channel access constraint and the detected one or more wireless systems.

In some embodiments, the network node 800 may further comprise a transceiver 803 operative to transmit signals to and receive signals from a wireless terminal, and a network interface 804 operative to communicate signals with back-end network elements.

Figure 9:
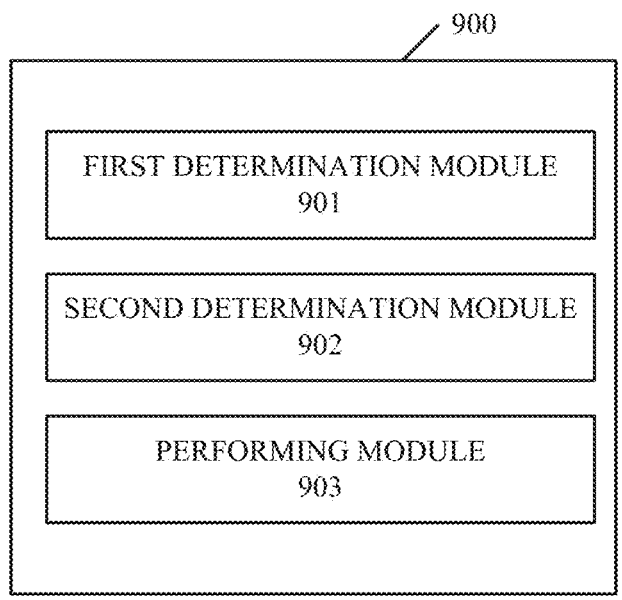
FIG. 9 is a schematic block diagram of a device for channel access according to some embodiments of the present disclosure.

FIG. 9 is a schematic block diagram of a device 900 for channel access in a first wireless system according to some embodiments of the present disclosure. The device 900 may be the access node of NR system. As shown in FIG. 9, the device 900 may comprise a first determination module 901, a second determination module 902, and a performing module 903. The first determination module 901 is operable to determine one or more wireless systems coexisted with the first wireless system on a channel, wherein the channel is operating on a shared spectrum. The second determination module 902 is operable to determine a channel access scheme based on the detected one or more wireless systems, the channel access scheme being one of LBT scheme, LAT scheme, and hybrid LBT and LAT scheme. The performing module 903 is operable to perform channel access according to the channel access scheme.

It should be noted that FIG. 9 merely illustrates various functional modules in the device 900, and a person skilled in the art can implement these functional modules in practice using any suitable software and hardware. Thus the embodiments herein are generally not limited to the shown structure of the device 900 and functional modules.

Figure 10:
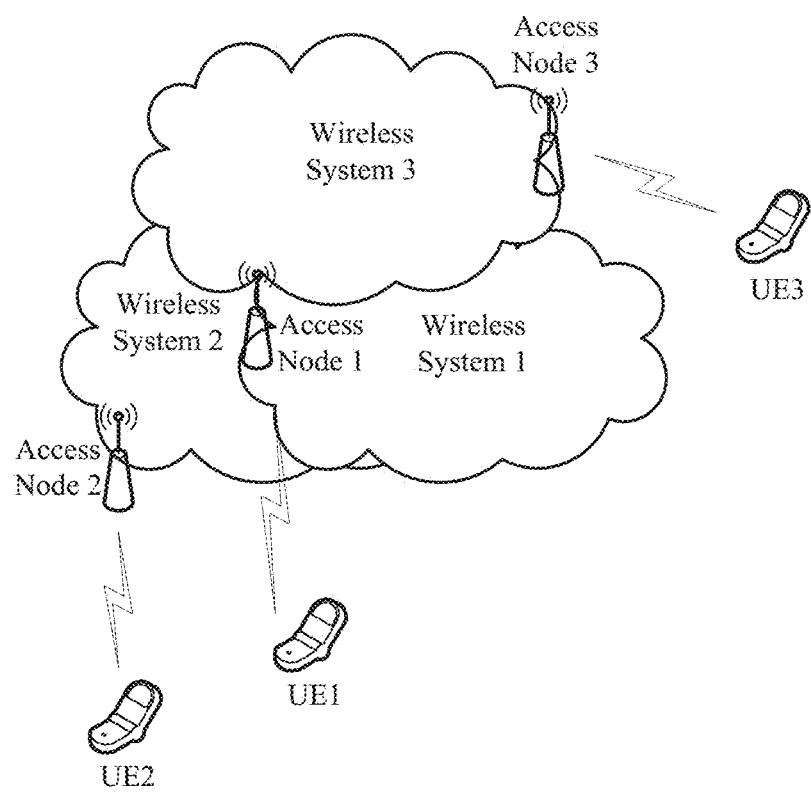
FIG. 10 illustrates an example in which the channel access mechanism according to some embodiments of the present disclosure can be implemented.

FIG. 10 illustrates an example in which the channel access mechanism according to some embodiments of the present disclosure can be implemented. As shown, wireless systems 1, 2, 3 are co-located and operate on the unlicensed spectrum. The wireless system 1 may be the NR system in which the method for channel access according to some embodiments of the present disclosure can be implemented. The wireless systems 2, 3 may be any one of Wi-Fi system, LAA system, or other NR system owned by another operator. UE2 accesses the wireless system 2 through the access node 2, and UE3 accesses the wireless system 3 through the access node 3.

Access node 1 in the wireless system 1 may be the network node 800 as shown in FIG. 8. UE1 accesses the wireless system 1 through the access node 1. When powered on, the access node 1 may detect other wireless systems coexisted with the wireless system 1 on an operating channel in the unlicensed spectrum. In the example as shown in FIG. 10, the access node 1 may detect the wireless systems 2, 3 as the coexisting systems. Assume the wireless system 2 is the Wi-Fi system performing LBT scheme, and the wireless system 3 is the NR system, owned by another operator, performing LAT scheme. The access node 1 may determine the channel access scheme as the hybrid LBT and LAT scheme. Then the access node 1 notifies the UE1 of the hybrid LBT and LAT scheme. When the access node 1 or UE1 wants to transmit data, the access node 1 or UE1 may perform channel access according to the hybrid LBT and LAT scheme.

In some embodiments of the present disclosure, there is also provided a computer program product executable by a device to cause the device to carry out the method for channel access according to some embodiments of the present disclosure.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure comprises any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a network node in a first wireless system for channel access comprising:
   detecting one or more wireless systems coexist with the first wireless system on a channel, the channel operating on a shared spectrum;
   determining a channel access scheme based on the detected one or more wireless systems, the channel access scheme being one of listen before talk (LBT) channel access scheme, listen after talk (LAT) channel access scheme, and hybrid LBT and LAT channel access scheme, wherein determining the channel access scheme comprises:
   determining whether the detected one or more wireless systems perform LBT channel access scheme or LAT channel access scheme;
   in response to all of the detected one or more wireless systems performing LBT channel access scheme, determining the channel access scheme as LBT channel access scheme;
   in response to all of the detected one or more wireless systems performing LAT channel access scheme, determining the channel access scheme as LAT channel access scheme; and
   in response to some of the detected one or more wireless systems performing LBT channel access scheme and some performing LAT channel access scheme, determining the channel access scheme as hybrid LBT and LAT channel access scheme; and
   performing channel access according to the channel access scheme.

2. The method according to claim 1 wherein detecting the one or more wireless systems coexist with the first wireless system on the channel comprises:
   detecting feature information specific to a wireless system on the channel; and
   in response to the detection of the feature information, determining existence of the wireless system on the channel.

3. The method according to claim 1 wherein detecting the one or more wireless systems coexist with the first wireless system on the shared spectrum comprises:
   obtaining information of a wireless system operating on the channel from at least one wireless device which is configured to monitor channel status of the channel; and
   determining the one or more wireless systems coexist on the channel from the obtained information.

4. The method according to claim 1 wherein, in response to determining the channel access scheme as hybrid LBT and LAT channel access scheme, performing the channel access according to the channel access scheme comprises:
   determining a first energy level of the channel from one or more wireless systems performing LBT channel access scheme among the detected one or more wireless systems;
   determining whether the channel is idle based on the first energy level; and
   in response to the determination that the channel is idle, transmitting signals in the channel according to LAT channel access scheme.

5. The method according to claim 4, wherein determining the first energy level of the channel from one or more wireless systems performing LBT channel access scheme among the detected one or more wireless systems comprises:
   detecting a total energy level of the channel;
   detecting an energy level from each wireless system performing LAT channel access scheme among the detected one or more wireless systems; and
   subtracting the detected energy levels from the total energy level to obtain the first energy level;
   or wherein determining the first energy level of the channel from one or more wireless systems performing LBT channel access scheme among the detected one or more wireless systems comprises:

detecting an energy level from each wireless system performing LBT channel access scheme among the detected one or more wireless systems; and summing the detected energy levels to obtain the first energy level.

6. The method according to claim 1 further comprising: determining a channel access constraint on the channel; wherein the channel access scheme is determined based on the channel access constraint and the detected one or more wireless systems.

7. The method according to claim 1 wherein the detection of the one or more wireless systems is performed at initialization of the network node or periodically or is triggered by a predefined event.

8. A network node in a first wireless system comprising:
a processor; and
a memory, said memory containing instructions executable by said processor, whereby said network node is operative to:
   detect one or more wireless systems that coexist with the first wireless system on a channel, the channel operating on a shared spectrum;
   determine a channel access scheme based on the detected one or more wireless systems, the channel access scheme being one of listen before talk (LBT) channel access scheme, listen after talk (LAT) channel access scheme, and hybrid LBT and LAT channel access scheme, wherein, when determining the channel access scheme, the network node is further operative to:
      determine whether the detected one or more wireless systems perform LBT channel access scheme or LAT channel access scheme;
      in response to all of the detected one or more wireless systems performing LBT channel access scheme, determine the channel access scheme as LBT channel access scheme;
      in response to all of the detected one or more wireless systems performing LAT channel access scheme, determine the channel access scheme as LAT channel access scheme; and
      in response to some of the detected one or more wireless systems performing LBT channel access scheme and some performing LAT channel access scheme, determine the channel access scheme as hybrid LBT and LAT channel access scheme; and
   perform channel access according to the channel access scheme.

9. The network node according to claim 8 wherein the network node is operative to detect the one or more wireless systems that coexist with the first wireless system on the channel by:
   detecting feature information specific to a wireless system on the channel; and
   in response to the detection of the feature information, determining existence of the wireless system on the channel.

10. The network node according to claim 8 wherein the network node is operative to detect the one or more wireless systems that coexist with the first wireless system on the channel by:

obtaining information of a wireless system operating on the channel from at least one wireless device which is configured to monitor channel status of the channel; and determining the one or more wireless systems that coexist on the channel from the obtained information.

11. The network node according to claim 8 wherein the network node is further operative to determine a channel access constraint on the channel;
and wherein the network node is operative to determine the channel access scheme based on the channel access constraint and the detected one or more wireless systems.

12. The network node according to claim 8 wherein the network node is operative to detect the one or more wireless systems at initialization of the network node or periodically or in response to a predefined event.

13. The network node according to claim 8 further comprising:
   a transceiver operative to transmit signals to and receive signals from a wireless terminal; and
   a network interface operative to communicate signals with backend network elements.

14. The network node according to claim 8, wherein the network node is operative to, in response to determining the channel access scheme as hybrid LBT and LAT channel access scheme, perform the channel access according to the channel access scheme by:
   determining a first energy level of the channel from one or more wireless systems performing LBT channel access scheme among the detected one or more wireless systems;
   determining whether the channel is idle based on the first energy level; and
   in response to the determination that the channel is idle, transmitting signals in the channel according to the LAT channel access scheme.

15. The network node according to claim 14, wherein the network node is operative to determine the first energy level of the channel from the one or more wireless systems performing LBT channel access scheme among the detected one or more wireless systems by:
   detecting a total energy level in the channel;
   detecting an energy level from each wireless system performing LAT channel access scheme among the detected one or more wireless systems; and
   subtracting a second energy level from the total energy level to obtain the first energy level;
   or wherein the network node is operative to determine the first energy level of the channel from the one or more wireless systems performing LBT channel access scheme among the detected one or more wireless systems by:
   detecting an energy level from each wireless system performing LBT channel access scheme among the detected one or more wireless systems; and
   summing the detected energy levels to obtain the first energy level.

* * * * *